(12) United States Patent
Ma et al.

(10) Patent No.: US 7,773,858 B2
(45) Date of Patent: Aug. 10, 2010

(54) OPTICAL DISC DRIVE AND METHOD FOR ADJUSTING WORKING SPEED

(75) Inventors: Mou-Ming Ma, Sindian (TW); Fu-Cheng Chu, Sindian (TW)

(73) Assignee: Giga-Byte Technology Co., Ltd., Taipei County (TW)

( * ) Notice: Subject to any disclaimer, the term of this patent is extended or adjusted under 35 U.S.C. 154(b) by 1402 days.

(21) Appl. No.: 10/998,590

(22) Filed: Nov. 30, 2004

(65) Prior Publication Data

US 2006/0114784 A1 Jun. 1, 2006

(51) Int. Cl.
*H04N 5/91* (2006.01)
(52) U.S. Cl. ........................ 386/68; 386/126
(58) Field of Classification Search ................ 386/46, 386/68, 72, 125, 126; 369/47.3, 47.41
See application file for complete search history.

(56) References Cited

U.S. PATENT DOCUMENTS 6,775,212 B2 * 8/2004 Takahashi ............... 369/47.3
7,339,862 B2 * 3/2008 Takenaka ............... 369/47.41

* cited by examiner

*Primary Examiner*—Huy T Nguyen
(74) *Attorney, Agent, or Firm*—Rosenberg, Klein & Lee

(57) ABSTRACT

An optical disc drive and the method for adjusting the working speed are disclosed. In the present method, the user decides the highest working speed in advance. Then, in response to an initiation event, the optical disc drive chooses one of the highest working speed and the pre-determined standard working speed as the actual working speed. The actual working speed depends on the determination whether the current working speed is higher than the standard working speed. If the determination is "true", the optical disc drive uses the standard working speed as the actual working speed. Otherwise, the optical disc drive uses the highest working speed as the actual working speed. Accordingly, for the present optical disc drive, it is easy to adjust the speed and thus the probability of disc shatter and noise level are reduced.

9 Claims, 3 Drawing Sheets

OPTICAL DISC DRIVE AND METHOD FOR ADJUSTING WORKING SPEED

BACKGROUND OF THE INVENTION (1) Field of the Invention

The invention relates to the field of the optical disc drive, and more particularly to the improvement in adjusting the speed of the optical disc drive so as to reduce the noise and the probability of disc shatter.

(2) Description of the Prior Art

As the increase in the requirement of users, the reading speed of the optical disk drive has increased from 8 time speed to the current 52 time speed. However, the increase in the rotation speed of spindle motor along with the increased reading speed also arises many problems, such as noise or disc shatter which is caused by the twist or scratch on the disk, insufficient strength, thickness or poor heat tolerance during high-speed rotation. Generally, the reading speed higher than 24× is required only when a large amount of data is read. On the other hand, in most cases, such as playing a CD or a DVD, the required reading speed is 24× speed. Therefore, it is common to depend on the situations to adjust the reading speed of the optical disk drive so as to reduce noise level and the possibility of disc shatter.

At present, the methods for adjusting the reading speed of the optical disc drive usually are achieved by the software as the interface operated by the user. However, this is troublesome sometimes. Alternatively, conveniently, through the buttons on the panel of the optical disc drive, the reading speed increases or decreases. For example, if the reject button is pressed, the optical disc drive will be accelerated to a user-defined working speed. However, the accompanying disadvantage is that it is unable to come back to the original reading speed unless the disc is rejected. Furthermore, the traditional optical disc drive is unable to adjust the reading speed by the user through the software.

SUMMARY OF THE INVENTION

Accordingly, it is one object of the present invention to provide a method for adjusting the working speed of an optical disc drive and the optical disc drive which implements the method so as to reduce the noise level and the probability of disc shatter.

In the present method, at first, the user decides a user-defined working speed of the optical disc drive. This step can be completed through a setting unit, executed on a computer. Then, in response to an initiation event, the optical disc drive executes a task choosing one between the user-defined working speed and a standard working speed to replace a current working speed of the optical disc drive. The task includes the following steps: acquiring the current working speed of the optical disc drive; determining whether the current working speed is higher than the standard working speed; if the determining is true, the optical disc drive using the standard working speed as its working speed; and if the determining is false, the optical disc drive using the user-defined working speed as its working speed.

Because in the present method the optical disc drive usually operate at the standard working speed (i.e. 24× reading speed) and the user is able to increase the working speed to the user-defined working speed (i.e. 52× reading speed) when desired, in most cases the optical disc drive operates at the low noise level. That is, the noise level of the optical disc drive can be significantly reduced.

In addition, the user-defined working speed is determined by the following steps: An expected value for the user-defined working speed is decided and inputted into the optical disc drive by the user. The maximum burst working speed of the optical disc drive is acquired. The optical disc drive determines whether the expected value is higher than the maximum burst working speed. If the determining is true, the user-defined working speed will be set equal to the maximum burst highest working speed. If the determining is false, the user-defined working speed will be set equal to the expected value.

Please note that the user-defined working speed is decided by the user. For example, although the maximum burst working speed (i.e. reading speed) of the optical disc drive is 52× speed, the user is able to adjust the user-defined working speed to 32× speed (i.e. reading speed) based on the consideration of disc quality and low noise level. Therefore, the optical disc drive operates at the speed no more than 32× speed. Thus, the probability of disc shatter and noise level can be reduced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
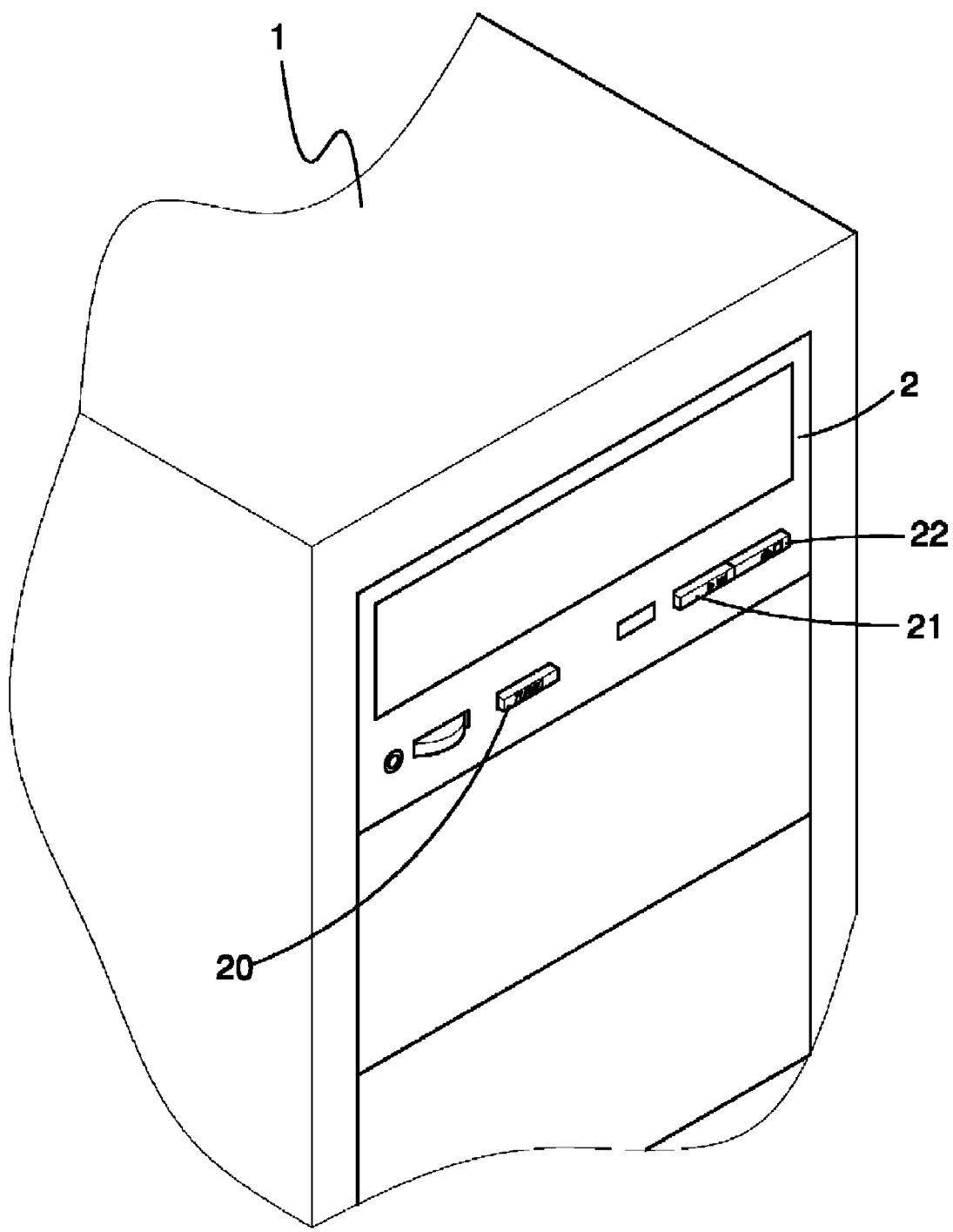
FIG. 1 shows a schematic view depicting the preferred embodiment of the present invention.

FIG. 1 shows a schematic view depicting the preferred embodiment of the present invention. The computer 1 is equipped with an optical disc drive 2 having a speed button 20, a play/search button 21 and a stop/reject button 22. The optical disc drive 2 is connected with the computer.

Further, in the optical disc drive 2, there is a control unit, not shown. The control unit decides the user-defined working speed and the standard working speed through a firmware. The user-defined working speed can be set by the user, under a safe condition, to be higher than or equal to the standard working speed. In the preferred embodiment, the user is able to adjust the value of the user-defined working speed through the setting unit executable on the computer 1, which is described in detail later. On the other hand, the standard working speed is determined by the manufacturer instead of the user.

Figure 2:
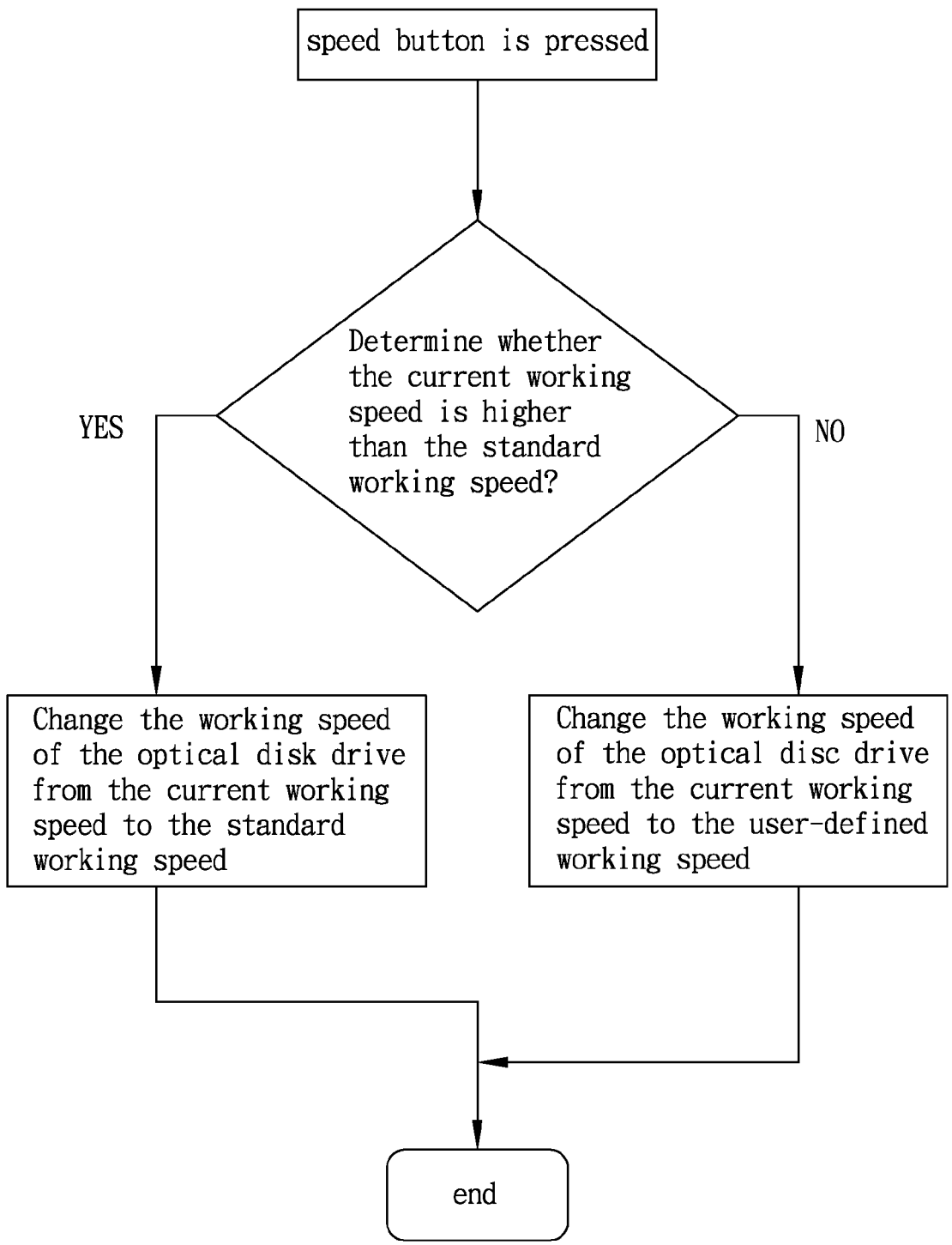
FIG. 2 shows a flowchart depicting how to switch the user-defined working speed and the standard working speed of the present optical disc drive.

Referring to FIG. 2, if the speed button 20 is pressed, an initiation event is triggered. In response to the initiation event, the optical disc drive 2 acquires the current working speed and then determines whether the current working speed is higher than the standard working speed or not. If the determination is "true", the optical disc drive 2 adjusts its working speed from the current working speed to the standard working speed. If the determination is "false", the optical disc drive 2 adjusts the working speed from the current working speed to the user-defined working speed. Note that when the determination is false, the current working speed is not higher than the standard working speed. Being not higher than the standard working speed, the current working speed may be lower than or equal to the standard speed.

Please note that the user-defined working speed means the user-defined reading speed of the optical disc drive or the user-defined rotation speed of the spindle motor. The standard working speed means the standard reading speed of the optical disc drive or the standard rotation speed of the spindle motor. The current working speed means the current reading speed of the optical disc drive or the current rotation speed of the spindle motor. Anyway, basically, the reading speed of the optical disc drive and the rotation speed of the spindle motor are proportional to each other. The higher reading speed means the higher rotation speed of the spindle motor, and vice versa. However, when the working speed of the optical disc drive is discussed, the reading speed is mentioned more often. Therefore, based on the above reason, in the following embodiment, the reading speed means the working speed of the optical disc drive.

It is assumed that the user has adjusted the user-defined reading speed of the optical disc drive to 32× speed, the pre-determined standard reading speed is 24× speed and the optical disc drive currently operates at 24× speed. That is, the current reading speed is 24× speed and the user-defined reading speed (32×)is higher than the standard reading speed (24×). After the speed button 20 is pressed, because the current reading speed (24×) is not higher than the standard reading speed (24×), this indicates that the user would like to increase the reading speed of the optical disc drive 2. Therefore, the optical disc drive 2 changes its reading speed from the current reading speed (24×) to the user-defined reading speed (32×). That is, the optical disc drive 2 is accelerated. Then, after the speed button is pressed again, because the current reading speed of the optical disc drive 2 (32×) is higher than the standard reading speed (24×), this indicates that the user would like to decrease the reading speed of the optical disc drive 2. Therefore, the reading speed of the optical disc drive 2 is adjusted to the standard reading speed (24×). That is, the optical disc drive 2 is decelerated. However, in another case where the user-defined reading speed is preset by the user to be 24× speed, which is equal to the standard reading speed (24×), the optical disc drive 2 will remain in the same reading speed (24×) even if the speed button 20 is pressed or re-pressed. Note that the optical disc drive 2 is not accelerated or decelerated since the eventual reading speed will be equal to either the user-defined reading speed (24×) or the standard reading speed (24), which is equal to one another, no matter the determination is true or false.

It is understood from the above description that the method of the present invention enables the optical disc drive 2 to be switched between the user-defined reading speed and the standard reading speed. Furthermore, in most cases, the optical disc drive 2 is operated at the standard working speed and thus has lower noise level. That is, the noise of the optical disc drive 2 can be significantly reduced.

Please note that the above-mentioned user-defined working speed is not the maximum burst working speed of the optical disc drive 2. The user-defined working speed is determined by the setting unit of the computer 1 in response to the steps shown in FIG. 3. The embodiment of the setting unit, not shown, can be an application program executing the steps shown in FIG. 3, including the follows. Firstly, the expected value X for the user-defined working speed is inputted into the setting unit by the user. Secondly, the maximum burst working speed of the optical disc drive 2 is acquired to determine whether the expected value X is higher than the maximum burst working speed. If the determination is "true", the user-defined working speed will be set equal to the maximum burst working speed. If the determination is "false", the user-defined working speed will be set equal to the expected value X.

Figure 3:
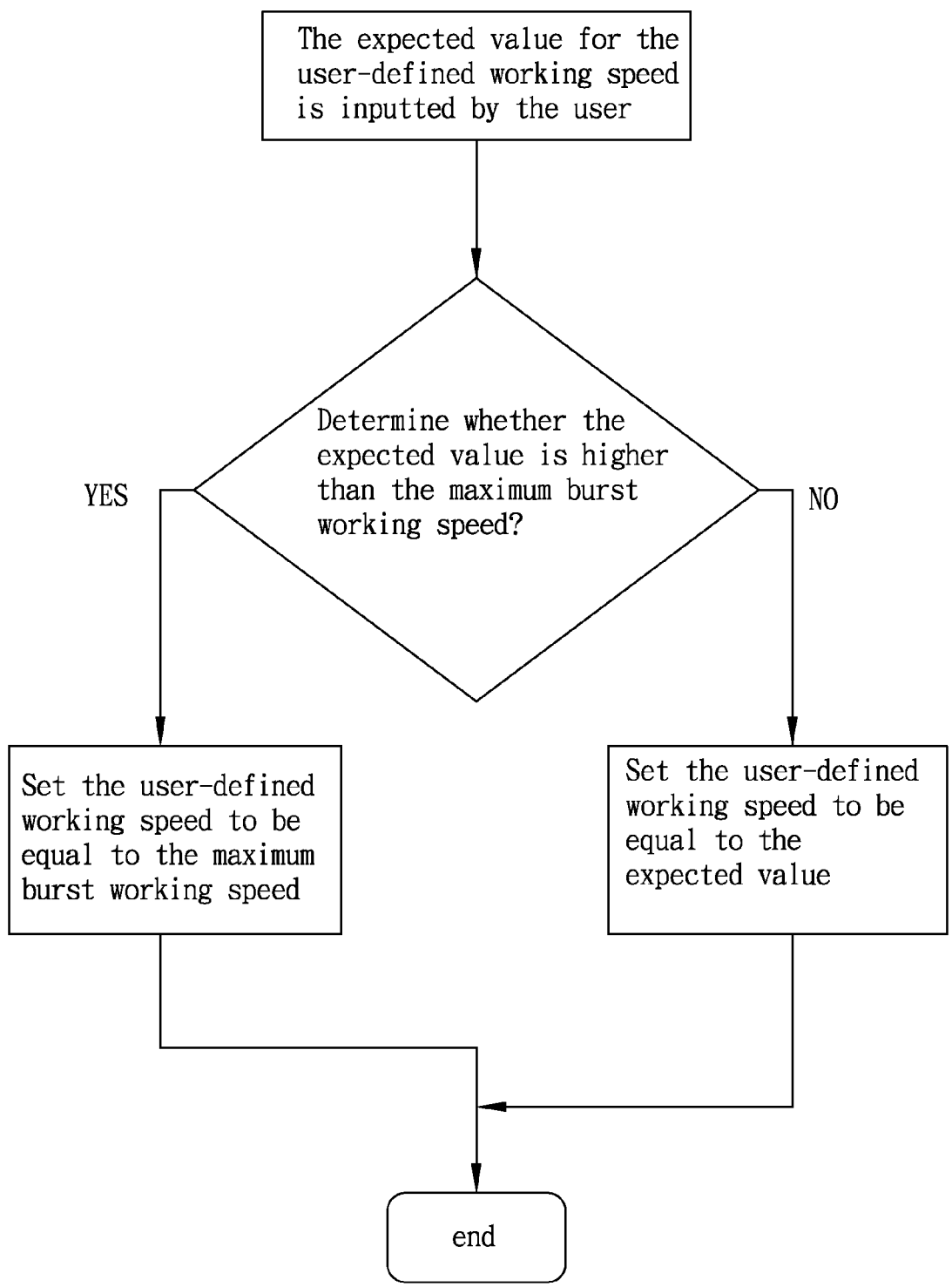
FIG. 3 shows a flowchart depicting how to set the user-defined working speed of the present optical disc drive.

In the embodiment shown in FIG. 3, the user-defined working speed means the user-defined reading speed of the optical disc drive or the user-defined rotation speed of the spindle motor, and the maximum burst working speed means the maximum burst reading speed of the optical disc drive or the maximum burst rotation speed of the spindle motor. Similarly, due to the reading speed is habitually used to express the working speed of the optical disc drive, the following embodiment uses the reading speed to represent the working speed of the optical disc drive.

It is assumed that the maximum burst reading speed of the optical disc drive 2 is as high as 52× speed. However, based on the consideration for low noise level and the best efficiency, the user-defined reading speed is suggested to set to the range between 8× and 32× speed, wherein 24× speed is preferred. Due to the user-defined reading speed of the optical disc drive 2 is 32× speed, the probability of disc shatter and high noise level is reduced undoubtedly. Thus this is one of the advantages that the user decides the desired user-defined reading speed.

In addition, even without the speed button 20, the above-mentioned initiation event can be triggered by pressing both of the play/search button 21 and the stop/reject button 22.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

We claim:

1. A method for adjusting the working speed of an optical disc drive, comprising:
   executing a task adjusting the working speed of the optical disc drive in response to an initiation event;
   wherein the task includes the following steps:
   acquiring a standard working speed, a user-defined working speed and the current working speed of the optical disc drive, wherein the standard working speed is pre-determined by the manufacturer, and the user-defined working speed is preset by a user; and
   determining whether the current working speed is higher than the standard working speed;
   selectively changing the working speed of the optical disc drive from the current working speed to the standard working speed if the current working speed is higher than the standard working speed;
   selectively changing the working speed of the optical disc drive from the current working speed to the user-defined working speed if the current working speed is less than the standard working speed;
   whereby the speed of the optical drive only toggles, responsive to the user's input, between the standard working speed and the user-defined working speed.

2. The method according to claim 1, wherein the user-defined working speed is predetermined by the following steps:
   acquiring an input value which is inputted by an user for the user-defined working speed;
   acquiring a maximum burst working speed of the optical disc drive; and
   determining whether the input value is higher than the maximum burst working speed;
   if the determining is true, the optical disc drive using the maximum burst working speed as the user-defined working speed;

if the determining is false, the optical disc drive using the input value as the user-defined working speed.

3. The method according to claim 1, wherein the user-defined working speed means the user-defined reading speed of the optical disc drive; the standard working speed means the standard reading speed of the optical disc drive; and the current working speed means the current reading speed of the optical disc drive.

4. The method according to claim 2, wherein the user-defined working speed means the user-defined reading speed of the optical disc drive; the standard working speed means the standard reading speed of the optical disc drive; the current working speed means the current reading speed of the optical disc drive; and the maximum burst working speed means the maximum burst reading speed of the optical disc drive.

5. The method according to claim 1, wherein the user-defined working speed means the user-defined rotation speed of an spindle motor of the optical disc drive; the standard working speed means the standard rotation speed of the spindle motor of the optical disc drive; and the current working speed means the current rotation speed of the spindle motor of the optical disc drive.

6. The method according to claim 2, wherein the user-defined working speed means the user-defined rotation speed of an spindle motor of the optical disc drive; the standard working speed means the standard rotation speed of the spindle motor of the optical disc drive; the current working speed means the current rotation speed of the spindle motor of the optical disc drive; and the maximum burst working speed means the maximum burst rotation speed of the spindle motor of the optical disc drive.

7. An optical disc drive including a control unit inside and at least one button outside; the control unit controlling the operation of the optical disc drive; the at least one button being configured to be pressed by a user in order to trigger an initiation event, the control unit being capable of executing a task adjusting the working speed of the optical disc drive once the initiation event is triggered, the task comprising:
   acquiring a standard working speed, a user-defined working speed and the current working speed of the optical disc drive, wherein the standard working speed is predetermined by the manufacturer, and the user-defined working speed is preset by the user; and determining whether the current working speed is higher than the standard working speed;
   selectively changing the working speed of the optical disc drive from the current working speed to the standard working speed if the current working speed is higher than the standard working speed;
   selectively changing the working speed of the optical disc drive from the current working speed to the user-defined working speed if the current working speed is less than the standard working speed;
   whereby the speed of the optical drive only toggles, responsive to the user's input, between the standard working speed and the user-defined working speed.

8. The optical disc drive according to claim 7, wherein the user-defined working speed means the user-defined reading speed of the optical disc drive; the standard working speed means the standard reading speed of the optical disc drive; and the current working speed means the current reading speed of the optical disc drive.

9. The optical disc drive according to claim 7, wherein the user-defined working speed means the user-defined rotation speed of an spindle motor of the optical disc drive; the standard working speed means the standard rotation speed of the spindle motor of the optical disc drive; and the current working speed means the current rotation speed of the spindle motor of the optical disc drive.

* * * * *